United States Patent
Li et al.

(10) Patent No.: US 9,137,710 B2
(45) Date of Patent: Sep. 15, 2015

(54) SWITCHING SYSTEM AND METHOD OF RINGING SESSION WITH CRBT

(75) Inventors: Shitao Li, Shenzhen (CN); Zhenhua Xie, Shenzhen (CN); Zhendong Li, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 226 days.

(21) Appl. No.: 13/504,543

(22) PCT Filed: Oct. 22, 2010

(86) PCT No.: PCT/CN2010/078029
§ 371 (c)(1),
(2), (4) Date: Apr. 27, 2012

(87) PCT Pub. No.: WO2011/050698
PCT Pub. Date: May 5, 2011

(65) Prior Publication Data
US 2012/0213202 A1 Aug. 23, 2012

(30) Foreign Application Priority Data
Oct. 28, 2009 (CN) .......................... 2009 1 0209151

(51) Int. Cl.
| H04W 36/00 | (2009.01) |
| H04M 7/12 | (2006.01) |
| H04M 3/42 | (2006.01) |

(52) U.S. Cl.
CPC ...... *H04W 36/0022* (2013.01); *H04M 3/42017* (2013.01); *H04M 7/126* (2013.01); *H04M 7/1225* (2013.01); *H04M 7/129* (2013.01); *H04M 2207/187* (2013.01)

(58) Field of Classification Search
None
See application file for complete search history.

(56) References Cited

U.S. PATENT DOCUMENTS 8,412,283 B2 * 4/2013 Li et al. .......................... 455/567
2007/0058791 A1 * 3/2007 Liu et al. ..................... 379/88.17

(Continued)

FOREIGN PATENT DOCUMENTS

| CN | 101141794 A | 3/2008 |
| CN | 101291537 A | 10/2008 |
| WO | 2008125329 A1 | 10/2008 |

OTHER PUBLICATIONS

G. Camarillo (Ericsson), "The Early Session Disposition Type for the Session Initiation Protocol (SIP)", Dec. 2004, RFC 3959, pp. 1-11.*

(Continued)

*Primary Examiner* — Andrew Chriss
*Assistant Examiner* — Joshua A Kading
(74) *Attorney, Agent, or Firm* — Ling Wu; Stephen Yang; Ling & Yang Intellectual Property

(57) ABSTRACT

A method for transferring an alerting phase session with customized alerting tone is disclosed. The method includes: when the transfer occurs in an alerting phase session with a customized alerting tone in the way of early session, a mobile switching center initiating a transfer of a normal media negotiation dialog and the MSC or customized alerting tones application server initiating a transfer of customized alerting tone session. A system for transferring an alerting phase session with customized alerting tone is also disclosed, and the system includes a mobile switching center and a customized alerting tones application server. In the present method and system, even the transfer from PS network to CS network occurs, the service experience of the calling user on the customized alerting tone session will not change, thus the normal call request is not affected and there is no need to modify the exiting IMS architecture.

13 Claims, 5 Drawing Sheets

(56) References Cited

U.S. PATENT DOCUMENTS

| | | |
|---|---|---|
| 2007/0286123 A1 | 12/2007 | Semper |
| 2008/0045239 A1* | 2/2008 | Sun .......................... 455/456.1 |
| 2009/0147754 A1* | 6/2009 | Long et al. .................... 370/331 |
| 2011/0170455 A1* | 7/2011 | Cai et al. ....................... 370/259 |
| 2012/0014356 A1* | 1/2012 | Mutikainen et al. .......... 370/331 |

OTHER PUBLICATIONS

3GPP TR 29.882 V8.0.0 (Sep. 2008), 3rd Generation Partnership Project; Technical Specification Group Core Network and Terminals; Customized Alerting Tones (CAT) in the 3GPP CS Domain (Rel. 8), pp. 1-11, 24-29.*

3GPP TR 23.872 V8.0.0 (Sep. 2008), 3rd Generation Partnership Project; Technical Specification Group Services and System Aspects Study on Architecture of IMS based Customized Alerting Tones (CAT); Stage 2 (Rel. 8).*

International Search Report for PCT/CN2010/078029 dated Jan. 10, 2011.

* cited by examiner

SWITCHING SYSTEM AND METHOD OF RINGING SESSION WITH CRBT

TECHNICAL FIELD

The present invention relates to the communication field, and particularly, to a system and method for transferring an alerting phase session with a customized alerting tone.

BACKGROUND OF THE RELATED ART

In the existing mobile network, a large number of networks based on packet switch (PS) networks (such as Evolved Universal Terrestrial Radio Access Network (E-UTRAN) and Universal Terrestrial Radio Access Network-High Speed Packet Access (UTRAN-HSPA)) are deployed, however, their coverage is not all-network or all-region. The signals of the PS network at some places would be very weak, then the transfer from the PS network to the conventional circuit switch (CS) network (such as UTRAN and Global System for Mobile Communications (GSM) Enhanced Data Rate for GSM Evolution (EDGE) Radio Access Network (GERAN)) needs to be provided to the user, especially when the user is during a session.

FIG. 1 is a transfer way recognized by the standard organization, and firstly there is a call between user equipment (UE) 1 and UE2 and it is a PS bearer based on an IP multimedia subsystem (IMS), the session of which is anchored in a service centralization and continuity application server (SCC AS). During the call, UE1 moves to an area with better coverage of CS network, at this moment, UE1 will send the received signal test report to a mobility management entity (MME) via the original PS network. When the MME knows that it has to transfer from PS network to CS network after receiving the test report, it sends a transfer request to one mobile switching center (MSC) which can cover UE1, and then the MSC sends the transfer request to the IMS; since the session is anchored in the SCC AS, the SCC AS will update the session with UE2 after receiving the transfer request. When the session update is completed, the MSC will return a transfer completion response to the MME, the MME returns the transfer completion response to UE1, and when receiving the transfer completion response, UE1 starts to disconnect from the PS network and establish a connection to the CS network via the MSC. During the entire transfer, the calling user and called user are not perceivable to the transfer.

As to an undergoing call, i.e. the calling party sends a call request and the called party is in the ringing state but has no reply, then the calling party can hear the customized alerting tone or ordinary ringtone. As to such a call, if the transfer condition is met, the transfer can also be carried out.

FIG. 2 is a flowchart of transferring an undergoing call origination request in the related art.

201: UE1 initiates a call origination request to the IMS network via a calling proxy call session control function (P-CSCF) or a calling serving call session control function (S-CSCF) to make a request for having a dialog with UE2;

202: when receiving the call origination request, the calling P-CSCF triggers a call to the calling serving call session control function (S-CSCF) according to the address of S-CSCF acquired when UE1 registers, then the S-CSCF triggers the call to the SCC AS; or when receiving the call origination, the calling S-CSCF triggers the call to the SCC AS;

203: the SCC AS anchors this call origination request and prepares for the subsequent transfer;

204: the SCC AS returns the call origination request to the calling S-CSCF;

205: the calling S-CSCF routes the call origination request to the called S-CSCF according to number of called user;

206: the called S-CSCF routes the call origination request to the called user UE2;

207: after receiving the call request, UE2 sends a 180 ringing to the calling user UE1 to indicate that the called UE2 has received the request;

208: at this moment, due to the change in location, UE1 receives the test report of the CS network indicating that the signals of the CS network are better and the dialog of the PS network is required to be transferred to the CS network;

209: an access layer network element (such as MME) notifies the MSC, then the MSC initiates a transfer request to the IMS network or initiates a transfer request to the IMS network via a media gateway control function (MGCF);

210: the calling I-CSCF sends the transfer request to the SCC AS;

211: after receiving the transfer request, the SCC AS updates one undergoing call of UE1 according to the contents in the request, which is mainly to update the media type and sending address of the calling UE1;

212: after receiving the update request, the called S-CSCF updates the undergoing call with UE1;

213: after having completed the update, UE2 sends an update completion reply to the called S-CSCF;

214: the called S-CSCF returns the update completion reply to the SCC AS;

215: after receiving the update completion reply of the called party, the SCC AS sends a transfer completion reply to the calling I-CSCF; and 216: the calling I-CSCF sends the transfer completion reply to the MSC or sends the transfer completion reply to the MSC via the MGCF.

By then, the transfer is substantially completed. However, during this transfer, the situation that the call has a customized alerting tone service is not taken into account, especially the situation that the customized alerting tone service is played in the way of early session.

When the customized alerting tone is played in the way of early session, its simplified procedure is as shown in FIG. 3.

301: UE1 initiates a call origination request with a session description protocol (SDP) request regarding to the normal media negotiation of call;

302: after receiving the call request, the calling IMS network element routes the call request to the called network side, and the called network routes the call request to a customized alerting tones application server (CAT AS) by way of the subscription information of the called user;

303: the CAT AS routes the call request to the called UE2;

304: UE2 returns a reply after receiving the call, and at the moment, the reply includes an SDP reply of UE2 on the normal media negotiation;

305: the CAT AS forwards the reply message of UE2 and inserts the SDP request of customized alerting tone session indicating the customized alerting tone service into the reply message;

306: the calling IMS network element forwards the reply message to the calling UE1;

307: UE1 replies the SDP reply of the customized alerting tone session according to the SDP request thereof so as to establish a SDP negotiation of a customized alerting tone media with the CAT AS;

308: also in step 306, UE1 also receives the SDP reply about normal media negotiation so as to establish a SDP negotiation of a normal media with UE2.

By then, the call is connected, UE1 can hear the customized alerting tone of the called user, and UE2 is in the ringing state.

It can be seen from the above call origination procedure that there are two SDP negotiations at the UE1 side, one is a SDP negotiation of the customized alerting tone media, which plays the customized alerting tone service, established with the CAT AS, and the other is a SDP negotiation of the normal media established with UE2.

If the transfer is carried out according to the procedure shown in FIG. 2, as to the situation that the MSC supports early session, when receiving the transfer request, the SCC AS will only update the SDP negotiation of the normal media, and the SDP negotiation of the customized alerting tone media will no longer be updated. As to one undergoing call origination, the calling user may have such experience: when the telephone is connected, the calling party hears the customized alerting tone played by the called party, at this moment, the location of the calling user changes and the transfer from PS network to CS network is required; after the transfer is completed, since the SDP negotiation of the customized alerting tone media is not updated, the customized alerting tone heard by the calling party will stop suddenly, and the normal ringtone will not be played, and at this moment, the calling party may deem that the call fails and hang up the telephone, thereby affecting the normal call.

SUMMARY OF THE INVENTION

The technical problem to be solved by the present invention is to provide a system and method for transferring an alerting phase session with a customized alerting tone, which can achieve that the service experience of the calling user on the customized alerting tone session will not change during the transfer from a PS network to a CS network.

In order to solve the above problem, the present invention provides a method for transferring an alerting phase session with a customized alerting tone, comprising:

when a transfer occurs in an alerting phase session with a customized alerting tone in a way of early session, a mobile switching center (MSC) initiating a transfer of a normal media negotiation dialog and the MSC or a customized alerting tones application server (CAT AS) initiating a transfer of a customized alerting tone session.

The step of the CAT AS initiating a transfer of a customized alerting tone session comprises: during call transfer, after receiving a call update reply returned by a called user, the CAT AS forwarding the call update reply to a service centralization and continuity application server (SCC AS) and inserting a session description protocol (SDP) request of the customized alerting tone session;

after the step of the CAT AS initiating a transfer of a customized alerting tone session, the method further comprises:

after receiving the call update reply, the SCC AS sending a transfer request reply to the MSC via a serving call session control function (S-CSCF), and inserting the SDP request of the customized alerting tone session into the transfer request reply;

after receiving the transfer request reply including the SDP request of the customized alerting tone session, the MSC returning a provisional acknowledgement including an SDP reply of the customized alerting tone session, and the provisional acknowledgement being sent to the CAT AS through S-CSCF and SCC AS successively; and after receiving the provisional acknowledgement carrying including the SDP reply of the customized alerting tone session, the CAT AS completing a negotiation update of the customized alerting tone session.

Before the step of the MSC initiating the transfer of the customized alerting tone session, the method further comprises: the service centralization and continuity application server (SCC AS) notifying the MSC to transfer the customized alerting tone session;

wherein the step of the SCC AS notifying the MSC to transfer the customized alerting tone session comprises: after receiving the call update reply returned from a called side network element, the SCC AS sending a transfer request reply to the MSC via the serving call session control function (S-CSCF) and notifying the MSC that the customized alerting tone session is required to be transferred;

the step of the MSC initiating the transfer of the customized alerting tone session comprises: after receiving a notification that the customized alerting tone session is required to be transferred, the MSC sending an update request including the SDP request of the customized alerting tone session, and the update request being sent to the CAT AS through interrogating CSCF (I-CSCF) and SCC AS successively; and after the step of the MSC initiating the transfer of the customized alerting tone session, the method further comprises: after receiving the update request including the SDP request of the customized alerting tone session, the CAT AS carrying out negotiation update for SDP of a customized alerting tone media.

Before the step of the MSC initiating the transfer of the customized alerting tone session, the method further comprises: the CAT AS notifying the MSC to transfer the customized alerting tone session;

the step of the CAT AS notifying the MSC to transfer the customized alerting tone session comprises:

after receiving a call update reply returned by called user, the CAT AS forwarding the call update reply to the SCC AS and notifying the MSC that the customized alerting tone session is required to be transferred; and after receiving the call update reply, the SCC AS sending the transfer request reply to the MSC via the S-CSCF;

the step of the MSC initiating the transfer of the customized alerting tone session comprises: after receiving the notification that the customized alerting tone session is required to be transferred, the MSC sending an update request including the SDP request of the customized alerting tone session, and the update request being sent to the CAT AS through interrogating CSCF (I-CSCF) and SCC AS successively; and after the step of the MSC initiating the transfer of a customized alerting tone session, the method further comprises:

after receiving the update request including the SDP request of the customized alerting tone session, the CAT AS carrying out the negotiation update for the SDP of the customized alerting tone media.

The SCC AS notifying the MSC that the customized alerting tone session is required to be transferred refers that the SCC AS inserts an indication that the customized alerting tone session needs to be transferred into the transfer request reply; and the CAT AS notifying the MSC that the customized alerting tone session is required to be transferred refers that the CAT AS inserts an indication that the customized alerting tone session needs to be transferred into the call update reply, and after receiving the call update reply, the SCC AS carries the indication that the customized alerting tone session needs to be transferred when sending the transfer request reply.

In order to solve the above problem, the present invention provides a system for transferring an alerting phase session with a customized alerting tone, comprising a mobile switching center (MSC) and a customized alerting tone application server (CAT AS), wherein the MSC is configured to initiate a transfer of a normal media negotiation dialog and transfer of a customized alerting tone session when transfer occurs in an alerting phase session with a customized alerting tone in a way of early session; and the CAT AS is configured to complete negotiation update of the customized alerting tone session after receiving an update request of customized alerting tone session.

The system further comprises a service centralization and continuity application server (SCC AS), a serving call session control function (S-CSCF), and an interrogating call session control function (I-CSCF); wherein the SCC AS is configured to send a transfer request reply to the MSC via the S-CSCF and notify the MSC that the customized alerting tone session needs to be transferred after receiving a call update reply returned by a called side network element; and the MSC is configured to initiate the transfer of the customized alerting tone session in the following way: after receiving a notification that the customized alerting tone session needs to be transferred, the MSC sending an update request including a SDP request of the customized alerting tone session, and the update request being sent to the CAT AS through I-CSCF and SCC AS successively.

The system further comprises a service centralization and continuity application server (SCC AS), a serving call session control function (S-CSCF), and an interrogating call session control function (I-CSCF); wherein the CAT AS is further configured to forward the received call update reply returned by a called user to the SCC AS and notify the MSC that the customized alerting tone session needs to be transferred;

the SCC AS is configured to after receiving the call update reply, send a transfer request reply to the MSC via the S-CSCF; and the MSC is configured to initiate the transfer of the customized alerting tone session in the following way: after receiving the notification that the customized alerting tone session needs to be transferred, the MSC sending an update request including the SDP request of the customized alerting tone session, and the update request being sent to the CAT AS through I-CSCF and SCC AS successively.

The SCC AS is configured to notify the MSC that the customized alerting tone session needs to be transferred in the following way: the SCC AS inserting an indication that the customized alerting tone session needs to be transferred into the transfer request reply;

the CAT AS is configured to notify the MSC that the customized alerting tone session needs to be transferred in the following way: the CAT AS inserts an indication that the customized alerting tone session needs to be transferred into the call update reply; and the SCC AS is further configured to carry the indication that the customized alerting tone session needs to be transferred when sending the transfer request reply after receiving the call update reply.

In order to solve the above problem, the present invention provides a system for transferring an alerting phase session with a customized alerting tone, comprising a mobile switching center (MSC) and a customized alerting tones application server (CAT AS), wherein the CAT AS is configured to initiate a transfer of a customized alerting tone session when transfer occurs in an alerting phase session with a customized alerting tone in a way of early session; and the MSC is configured to initiate a transfer of a normal media negotiation dialog when transfer occurs in an alerting phase session with a customized alerting tone in the way of early session and complete a negotiation update of the customized alerting tone session after receiving a update request of the customized alerting tone session.

The system further comprises a service centralization and continuity application server (SCC AS) and a serving call session control function (S-CSCF);

the CAT AS is configured to initiate a transfer of the customized alerting tone session in the following way:

after receiving a call update reply returned by the called user, the CAT AS inserts a SDP request of the customized alerting tone session into the call update reply; and the SCC AS is configured to send a transfer request reply, which includes the SDP request of the customized alerting tone session, to the MSC via the S-CSCF after receiving the call update reply.

In summary, the present invention provides a system and method for transferring an alerting phase session with a customized alerting tone, and even the transfer from a PS network to a CS network occurs, the service experience of the calling user on the customized alerting tone session will not change, thus the normal call request is not affected and there is no need to modify the exiting IMS architecture and it is simple to practice.

PREFERRED EMBODIMENTS OF THE PRESENT INVENTION

Figure 1:
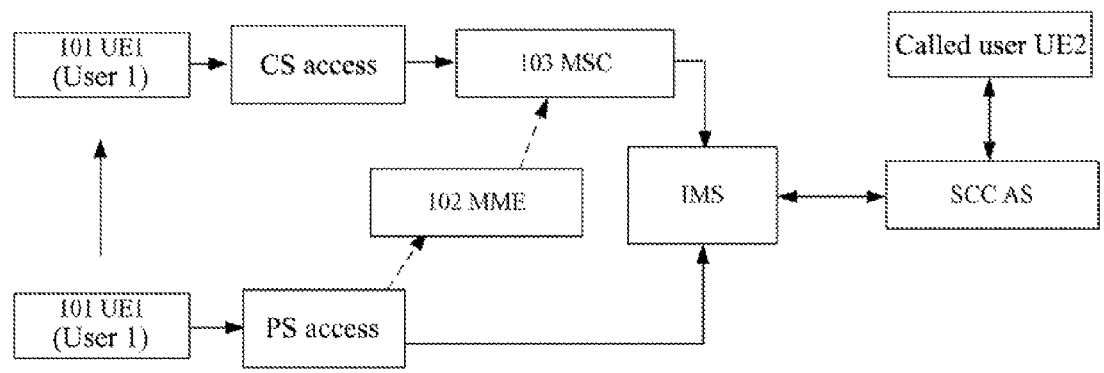
FIG. 1 is a known transfer architecture diagram.
Figure 2:
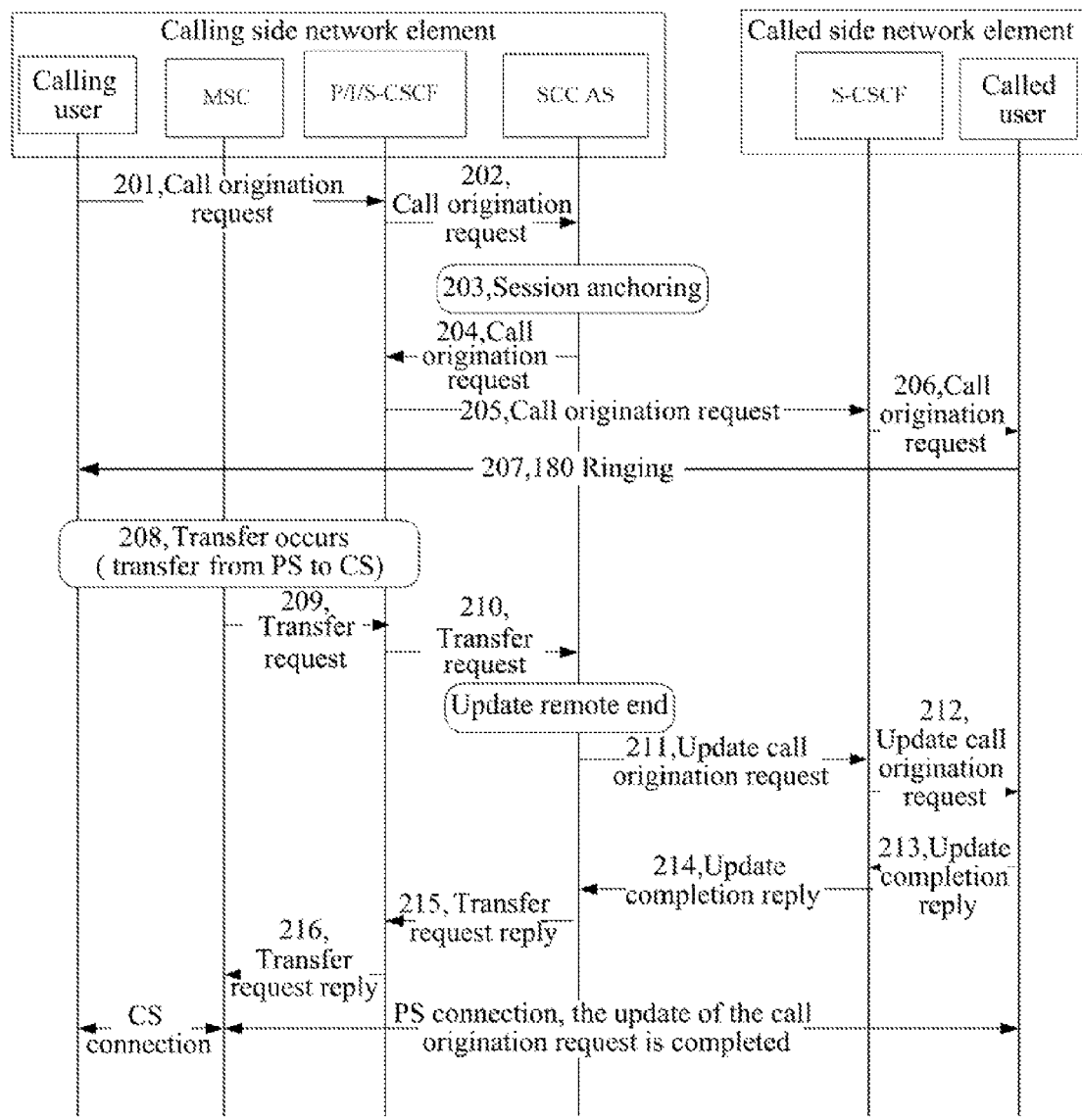
FIG. 2 is a known flowchart of transferring an undergoing call origination request.
Figure 3:
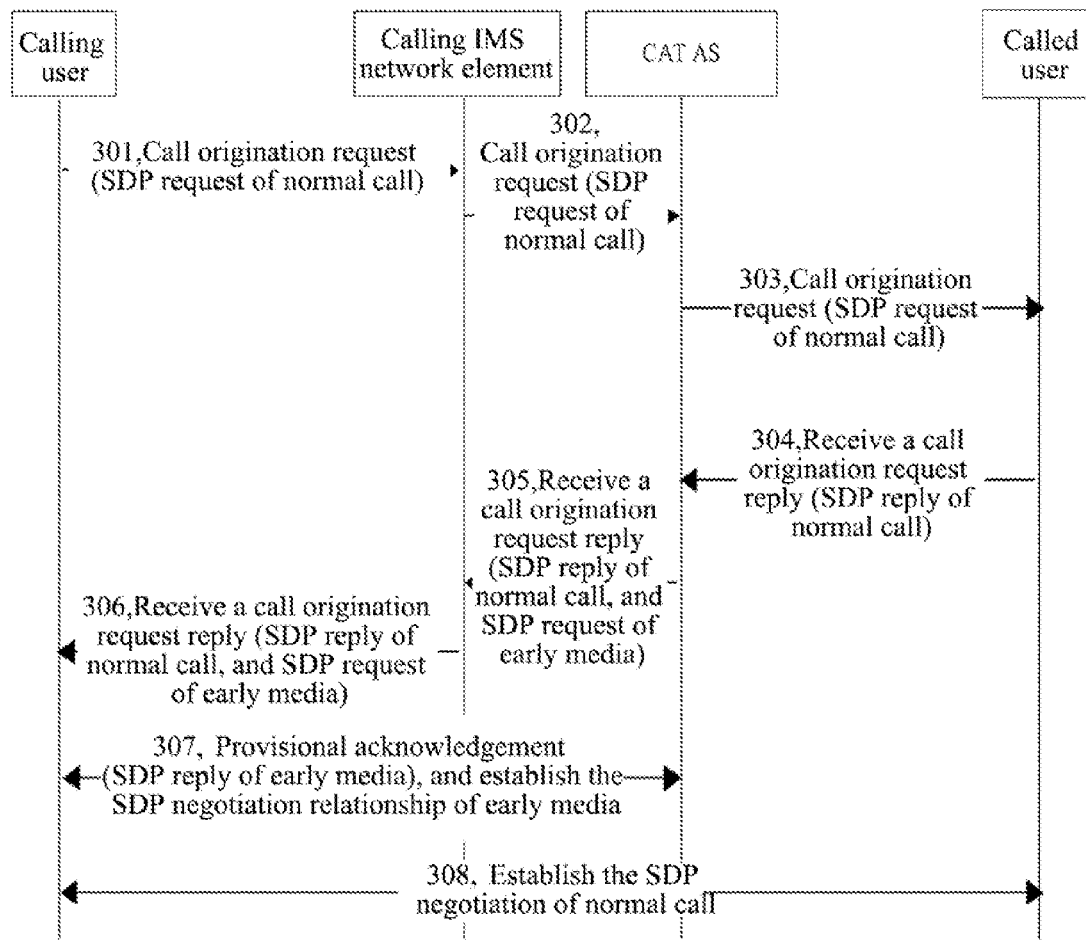
FIG. 3 is a simplified flowchart of playing a customized alerting tone service in the early session mode.

The present invention provides a system and method for transferring an alerting phase session with a customized alerting tone, and when transfer occurs in an alerting phase session with a customized alerting tone in the way of early session, a MSC initiates a transfer of a normal media negotiation dialog and the MSC or a CAT AS initiates a transfer of a customized alerting tone session.

System Embodiments

Embodiment I

This embodiment provides a system for transferring an alerting phase session with a customized alerting tone, comprising a MSC, a CAT AS, a SCC AS, a S-CSCF and a called user;

the MSC is configured to initiate a transfer of a normal media negotiation dialog and transfer of a customized alerting tone session when transfer occurs in an alerting phase session with a customized alerting tone in the way of early session; and the CAT AS is configured to complete negotiation update of the customized alerting tone session after receiving an update request of the customized alerting tone session.

In this embodiment, it can be the SCC AS or CAT AS to notify the MSC that the customized alerting tone session needs to be transferred;

(a) when the SCC AS is used to notify the MSC that the customized alerting tone session needs to be transferred, the SCC AS is further configured to send a transfer request reply to the MSC via the S-CSCF and notify the MSC that the customized alerting tone session needs to be transferred after receiving a call update reply returned by a called side network element; and the MSC is configured to initiate the transfer of the customized alerting tone session in the following way: after receiving the notification that the customized alerting tone session needs to be transferred, the MSC sending an update request including an SDP request of the customized alerting tone session, and the update request being sent to the CAT AS through the S-CSCF and SCC AS successively;

the CAT AS is configured to complete negotiation update of the customized alerting tone session after receiving an update request including the SDP request of the customized alerting tone session.

The SCC AS is configured to notify the MSC that the customized alerting tone session needs to be transferred in the following way: the SCC AS inserts an indication that the customized alerting tone session needs to be transferred into the transfer request reply.

(b) when the CAT AS is utilized to notify the MSC that the customized alerting tone session needs to be transferred, the CAT AS is further configured to forward the received call update reply returned by a called user to the SCC AS and notify the MSC that the customized alerting tone session needs to be transferred;

the SCC AS is further configured to, after receiving the call update reply, send a transfer request reply to the MSC via the S-CSCF;

the MSC is configured to initiate the transfer of the customized alerting tone session in the following way: after receiving the notification that the customized alerting tone session needs to be transferred, the MSC sending an update request including an SDP request of the customized alerting tone session, and the update request being sent to the CAT AS through the S-CSCF and SCC AS successively;

the CAT AS is configured to complete negotiation update of the customized alerting tone session after receiving an update request including the SDP request of the customized alerting tone session.

The CAT AS is configured to notify the MSC that the customized alerting tone session needs to be transferred in the following way: the CAT AS inserting an indication that the customized alerting tone session needs to be transferred into the call update reply; and the SCC AS is further configured to carry the indication that the customized alerting tone session needs to be transferred when sending the transfer request reply after receiving the call update reply.

Embodiment II

This embodiment provides a system for transferring an alerting phase session with a customized alerting tone, comprising a MSC, a CAT AS, a SCC AS, a S-CSCF and a called user; wherein the CAT AS is configured to initiate a transfer of a customized alerting tone session when transfer occurs in an alerting phase session with a customized alerting tone in the way of early session; and the MSC is configured to initiate a transfer of a normal media negotiation dialog when transfer occurs in a ring state session with a customized alerting tone in the way of early session and complete the negotiation update of the customized alerting tone session after receiving the update request of the customized alerting tone session.

The CAT AS is configured to initiate an update request of the customized alerting tone session in the following way:

after receiving the call update reply returned by the called user, the CAT AS inserts the SDP request of the customized alerting tone session into the call update reply; and the SCC AS is configured to send a transfer request reply including the SDP request of the customized alerting tone session to the MSC via the S-CSCF after receiving the call update reply; and the MSC is configured to complete the negotiation update of the customized alerting tone session after receiving the transfer request reply.

Method Embodiments

The present invention provides a system and method for transferring an alerting phase session with a customized alerting tone, and when transfer occurs in an alerting phase session with a customized alerting tone in the way of early session, the transfer is carried out not only on a normal media negotiation dialog but also on a customized alerting tone session; an MSC initiates a transfer of the normal media negotiation dialog and the MSC or a CAT AS initiates a transfer of the customized alerting tone session.

Hereinafter, the method of the present invention will be described in detail in conjunction with the accompanying drawings by several embodiments.

Embodiment I

Figure 4:
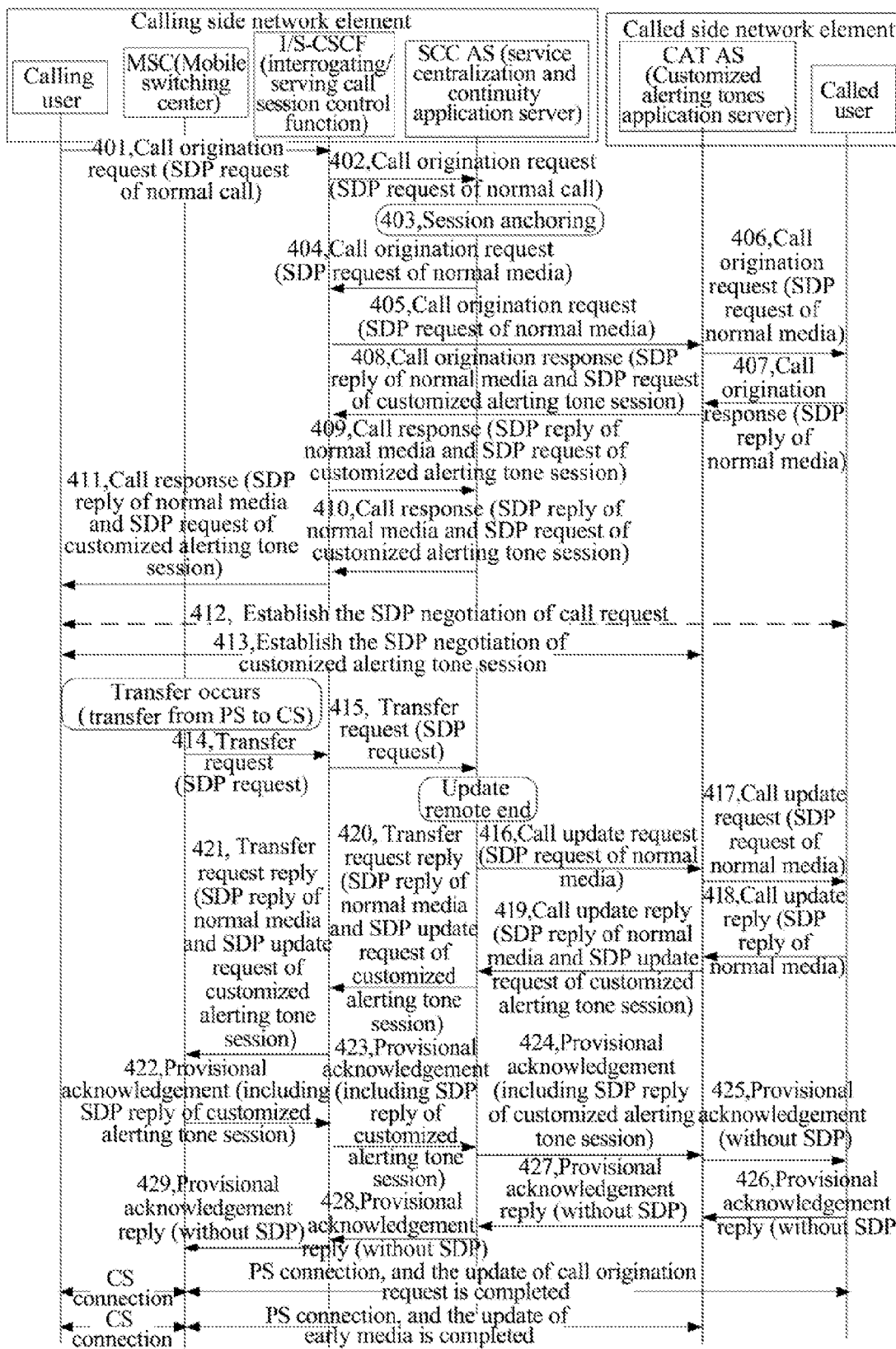
FIG. 4 is a flowchart of transferring an alerting phase session with a customized alerting tone according to embodiment I of the present invention.

In this embodiment, the transfer of a customized alerting tone session is initiated by the CAT AS located at the called side, and the specific procedure is as shown in FIG. 4:

401: the calling UE1 initiates one call request including an SDP request of normal media negotiation;

402: the S-CSCF triggers the call request to the SCC AS;

403: the SCC AS anchors the call request;

404: the SCC AS sends the call request to the S-CSCF;

405: the S-CSCF routes the call to the called user network;

406: the called network receives the call request and triggers the request to the CAT AS, then the CAT AS sends the call request to the called user UE2 via the called network;

407: the called user receives the call request and sends a receiving response including an SDP reply of normal media negotiation;

408: the CAT AS inserts the SDP request of the customized alerting tone media into the called response and sends a call origination response to the S-CSCF;

409: the S-CSCF triggers the call response to the SCC AS (including the SDP reply of normal media negotiation and SDP request of customized alerting tone media negotiation);

410: the SCC AS records the information in the call response, including information about the normal call and information about the customized alerting tone media, and forwards the call response to the S-CSCF;

411: the S-CSCF forwards the call response to the calling UE1 (including the SDP reply of normal media negotiation and SDP request of customized alerting tone media negotiation);

412: after UE1 has received the SDP reply of normal media negotiation, the establishment of the SDP negotiation of normal media is completed.

413: UE1 replies the SDP reply of customized alerting tone media to the CAT AS, so that the SDP negotiation of customized alerting tone media is also established.

414: the location of the calling user changes and the transfer condition is met, and then the MSC sends a transfer request to the I-CSCF of the IMS network, which includes the indication of supporting the early session way and includes the media resources information of the MSC (due to being connected to the CS media, it is also referred to as CS media resource information);

415: the I-CSCF triggers the transfer request to the SCC AS;

416: the SCC AS receives the above transfer request, and it judges the dialog of the calling party and sends a call update request including the SDP request of the normal media to the called UE2, and updates the SDP negotiation of the normal media;

417: the CAT AS forwards the received call update request to UE2;

418: UE2 receives the call update request, updates the SDP negotiation of the normal media, and returns a call update reply to the CAT AS, which includes the SDP reply of the normal media (including media information of UE2).

419: the CAT AS forwards the call update reply to the SCC AS and inserts an SDP update request of the customized alerting tone media into the call update reply to indicate that the SDP negotiation of the customized alerting tone media needs to be updated;

420: after receiving the call update reply, the SCC AS sends a transfer request reply to the I-CSCF, which not only includes the SDP reply of the normal media but also includes the SDP update request of the customized alerting tone media;

421: the I-CSCF forwards the received transfer request reply to the MSC;

422: the MSC judges the SDP update request with the customized alerting tone media in the reply messages and replies the SDP reply of the customized alerting tone media to the CAT AS via the I-CSCF so as to update the SDP negotiation of the customized alerting tone media. In this example, the SDP negotiation of the customized alerting tone media can be brought to the CAT AS via a provisional acknowledgement (PRACK);

423: the I-CSCF forwards the received provisional acknowledgement to the SCC AS, which includes the SDP reply of the customized alerting tone media;

424: the SCC AS forwards the provisional acknowledgement to the CAT AS, at this moment, the update of the SDP negotiation of the customized alerting tone media is completed.

The provisional acknowledgement will be replied according to the related art subsequently;

425: the CAT AS updates the information about the customized alerting tone media, removes the SDP reply of the customized alerting tone media therein, and forwards an empty provisional acknowledgement to UE2;

426-429: UE2 carries out no processing on the empty provisional acknowledgement without the SDP reply, and then returns a provisional acknowledgement reply to the CAT AS via a Session Initiation Protocol (SIP) layer, and the provisional acknowledgement reply does not include the SDP information and it is forwarded to the MSC via the SCC AS and S-CSCF.

At the moment, the transfer of the call between the calling UE1 and the called UE2 is completed, not only the update of the SDP negotiation of the normal media is completed, but also the update of the SDP negotiation of the customized alerting tone media is completed.

Embodiment II

Figure 5:
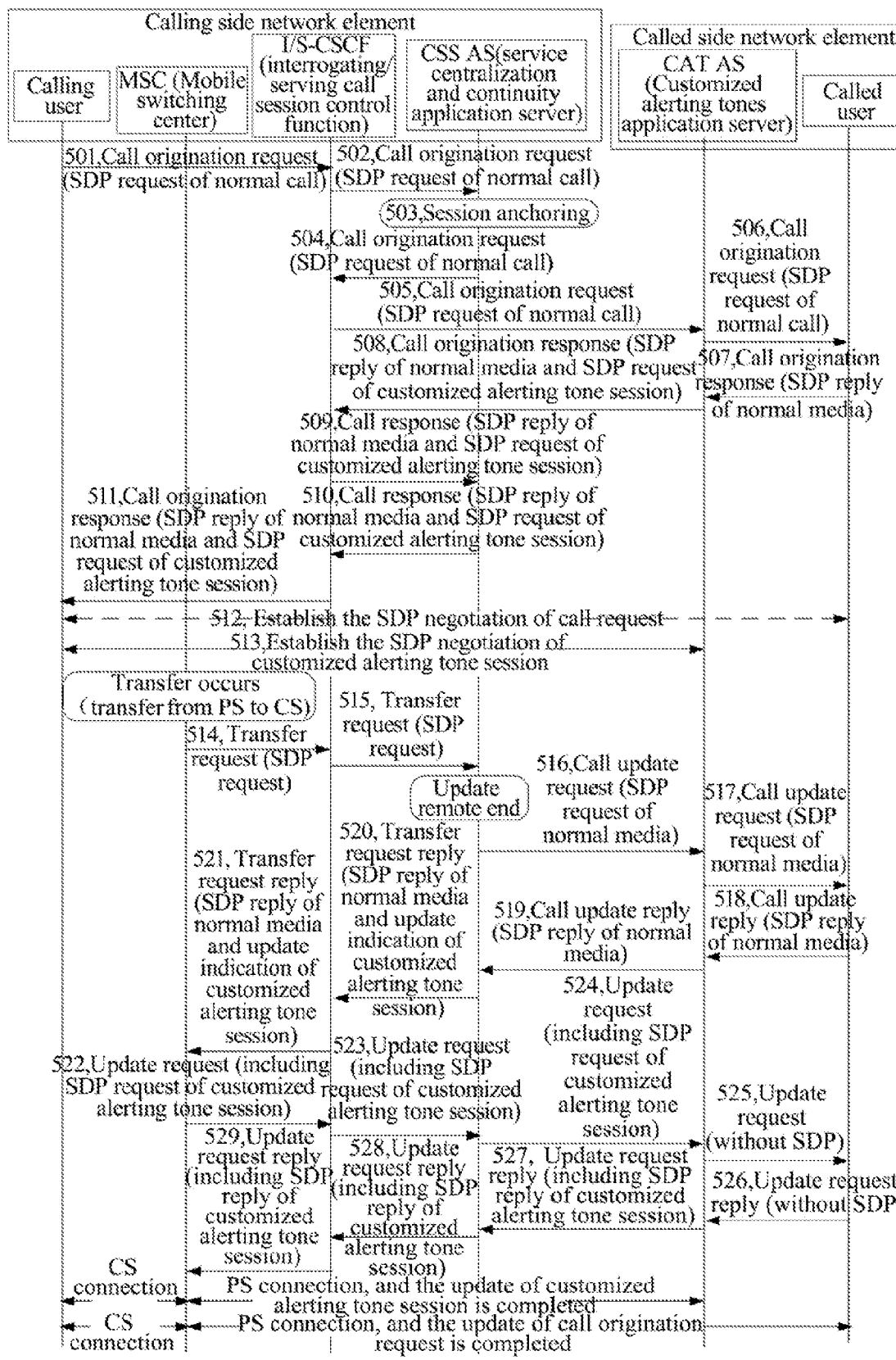
FIG. 5 is a flowchart of transferring an alerting phase session with a customized alerting tone according to embodiment II of the present invention.

In this embodiment, the transfer of a customized alerting tone media is initiated by the MSC at the calling side, and the specific procedure is as shown in FIG. 5:

501: the calling UE1 initiates one call request with an SDP request of a normal media;

502: the S-CSCF triggers the call request to the SCC AS;

503: the SCC AS anchors the call request;

504: the SCC AS sends the call request to the S-CSCF;

505: the S-CSCF routes the call to the called user network;

506: the called network receives the call request and triggers the request to the CAT AS, then the CAT AS sends the call request to the called user UE2 via the called network;

507: the called user receives the call request and sends a receiving response including an SDP reply of the normal media;

508: after receiving the response, the CAT AS inserts the SDP request indicting the customized alerting tone media into the response;

509: the S-CSCF triggers the call response to the SCC AS (including the SDP reply of normal media negotiation and SDP request of customized alerting tone media negotiation);

510: the SCC AS records the information in the call response, including information about the normal call and information about the customized alerting tone media, and it returns the call response to the S-CSCF;

511: the S-CSCF forwards the call response to the calling UE1 (including the SDP reply of normal media negotiation and SDP request of customized alerting tone media negotiation);

512: after UE1 has received the SDP reply of normal media negotiation, the establishment of the SDP negotiation of normal media is completed.

513: UE1 replies the SDP reply of customized alerting tone media to the CAT AS, so that the SDP negotiation of customized alerting tone media is also established.

514: the location of the calling user changes and the transfer condition is met, then the MSC sends a transfer request to the MS network, which includes the indication of supporting the early session way and includes the information about the media resources of the MSC (due to being connected to the CS media, it is also referred to as CS media resource information);

515: the I-CSCF triggers the transfer request to the SCC AS;

516: the SCC AS judges the dialog of the calling party and sends a call update request to the called UE2, which includes the SDP request of the normal media, and it updates the SDP negotiation of the normal media;

517: the CAT AS forwards the received call update request to UE2;

518: UE2 receives the call update request, updates the SDP negotiation of the normal media, and returns a call update reply to the CAT AS, which includes the SDP reply of the normal media (including media information about UE2);

519: the CAT AS forwards the call update reply to the SCC AS;

520: after the SCC AS has received the call update reply, the SCC AS learns that the call includes a customized alerting tone service according to the previously stored call information and notifies the MSC that the customized alerting tone media needs to be transferred, and the way of notifying the MSC that the customized alerting tone media needs to be transferred can be but not limited to inserting an indication that the customized alerting tone media needs to be transferred into the transfer request reply, and the indication can be a parameter in one SIP protocol or in the form of extensible markup language (XML);

521: the I-CSCF forwards the transfer request reply to the MSC, which carries the indication that the customized alerting tone media needs to be transferred;

522: the MSC receives the transfer request reply, sends an update request to the I-CSCF according to the indication therein that the customized alerting tone media needs to be transferred, and the update request carries the SDP request of the customized alerting tone media, and then MSC updates the SDP negotiation of the customized alerting tone media according to the related art;

in this example, it can be as follows:

523: the I-CSCF forwards the update request including the SDP request of the customized alerting tone media to the SCC AS;

524: the SCC AS forwards the update request including the SDP request of the customized alerting tone media to the CAT AS;

525: the CAT AS carries out negotiation update on the customized alerting tone media, removes the SDP request of the customized alerting tone media, and sends the update request to UE2;

526: UE2 carries out no processing on the update request and returns an update request reply to the CAT AS;

527: the CAT AS inserts the SDP reply of the customized alerting tone media into the update request reply and sends the update request reply to the SCC AS; and 528-529: the SCC AS sends the update request reply including the SDP reply of the customized alerting tone media to the MSC via the I-CSCF, by then the update of the SDP negotiation of the customized alerting tone media is completed.

By then, the transfer of the call between the calling UE1 and the called UE2 is completed, not only the update of the SDP negotiation of the normal media is completed, but also the update of the SDP negotiation of the customized alerting tone media is completed.

In this embodiment, it can be the CAT AS to notify the MSC that the customized alerting tone media needs to be transferred, i.e. it can be that in step 519, the indication that the customized alerting tone media needs to be transferred is inserted into the call update reply to be sent to the MSC, and the transfer request reply is forwarded to the MSC via the I-CSCF, and then the procedure of the MSC initiating early media update is the same as steps 522 to 529.

In embodiments I and II, the MSC also can carry out the update of the SDP negotiation of the early media with the called user according to the SDP request and the reply mechanism via the MGCF, and which way is specifically employed is based on the function selection of the MSC in specific scenarios, and it is not limited in the present invention.

In summary, by way of the technical solution of the present invention, the existing IMS architecture needs not be modified, and it is only required to enhance the function of SCC AS or CAT AS to achieve the transfer of the undergoing call with a customized alerting tone session from the PS network to the CS network.

Those skilled in the art shall understand that all of or part of the steps in the above methods can be completed by instructing relevant hardware by programs, and the programs can be stored in a computer readable storage medium, such as read only memory, magnetic disk, or optical disk, etc. Optionally, all of or part of the steps of the above embodiments can also be implemented by using one or more integrated circuits.

INDUSTRIAL APPLICABILITY

The present invention provides a system and method for transferring an alerting phase session with a customized alerting tone, even transfer from a PS network to a CS network occurs, the service experience of the calling user on the customized alerting tone session will not change, thus the normal call request is not affected and there is no need to modify the exiting IMS architecture and it is simple to practice.

What is claimed is:

1. A method for transferring an alerting phase session with a customized alerting tone, the method comprising:
when transfer from a Packet Switch (PS) network to a Circuit Switch (CS) network occurs in an alerting phase session in which a customized alerting tone is played according to Early Session mode, a mobile switching center (MSC) initiating a transfer of a normal media negotiation dialog between a calling user equipment (UE) and a called UE from the PS network to the CS network, and initiating a transfer of a customized alerting tone session between the calling UE and a customized alerting tones application server (CAT AS) from the PS network to the CS network by the MSC or the CAT AS to complete updates of both a Session Description Protocol (SDP) negotiation of the normal media between the calling UE and the called UE and a SDP negotiation of a customized alerting tone media of the customized alerting tone session between the calling UE and the CAT AS.

2. The method as claimed in claim 1, wherein
the step of the CAT AS initiating the transfer of the customized alerting tone session comprises: during call transfer, after receiving a call update reply returned by a called user, the CAT AS forwarding the call update reply to a service centralization and continuity application server (SCC AS) and inserting a SDP request of the customized alerting tone session;
after the step of the CAT AS initiating the transfer of the customized alerting tone session, the method further comprises:
after receiving the call update reply, the SCC AS sending a transfer request reply to the MSC via a serving call session control function (S-CSCF), and inserting the SDP request of the customized alerting tone session;
after receiving the transfer request reply including the SDP request of the customized alerting tone session, the MSC returning a provisional acknowledgement including a SDP reply of the customized alerting tone session, and the provisional acknowledgement being sent to the CAT AS through the S-CSCF and the SCC AS successively; and
after receiving the provisional acknowledgement including the SDP reply of the customized alerting tone session, the CAT AS completing a negotiation update of the customized alerting tone session.

3. The method as claimed in claim 1, wherein
before the step of the MSC initiating the transfer of the customized alerting tone session, the method further comprises: a service centralization and continuity application server (SCC AS) notifying the MSC that the customized alerting tone session needs to be transferred;

wherein the step of the SCC AS notifying the MSC that the customized alerting tone session needs to be transferred comprises: after receiving a call update reply returned from a called side network element, the SCC AS sending a transfer request reply to the MSC via a serving call session control function (S-CSCF) and notifying the MSC that the customized alerting tone session needs to be transferred;

the step of the MSC initiating the transfer of the customized alerting tone session comprises: after receiving the notification that the customized alerting tone session needs to be transferred, the MSC sending an update request including a SDP request of the customized alerting tone session, and the update request being sent to the CAT AS through an interrogating CSCF (I-CSCF) and the SCC AS successively; and after the step of the MSC initiating the transfer of the customized alerting tone session, the method further comprises: after receiving the update request including the SDP request of the customized alerting tone session, the CAT AS carrying out update of the SDP negotiation of the customized alerting tone media.

4. The method as claimed in claim 3, wherein the SCC AS notifying the MSC that the customized alerting tone session needs to be transferred is implemented by: the SCC AS inserting an indication that the customized alerting tone session needs to be transferred into the transfer request reply.

5. The method as claimed in claim 1, wherein before the step of the MSC initiating the transfer of the customized alerting tone session, the method further comprises: the CAT AS notifying the MSC that the customized alerting tone session needs to be transferred;

the step of the CAT AS notifying the MSC that the customized alerting tone session needs to be transferred comprises:

after receiving a call update reply returned by a called user, the CAT AS forwarding the call update reply to a service centralization and continuity application server (SCC AS) and notifying the MSC that the customized alerting tone session needs to be transferred; and after receiving the call update reply, the SCC AS sending a transfer request reply to the MSC via a serving call session control function (S-CSCF);

the step of the MSC initiating the transfer of the customized alerting tone session comprises: after receiving the notification that the customized alerting tone session needs to be transferred, the MSC sending an update request including a SDP request of the customized alerting tone session, and the update request being sent to the CAT AS through an interrogating CSCF (I-CSCF) and the SCC AS successively; and after the step of the MSC initiating the transfer of the customized alerting tone session, the method further comprises:

after receiving the update request including the SDP request of the customized alerting tone session, the CAT AS carrying out update of the SDP negotiation of the customized alerting tone media.

6. The method as claimed in claim 5, wherein the CAT AS notifying the MSC that the customized alerting tone session needs to be transferred is implemented by: the CAT AS inserting the indication that the customized alerting tone session needs to be transferred into the call update reply, and after receiving the call update reply, the SCC AS including the indication that the customized alerting tone session needs to be transferred in the transfer request reply when sending the transfer request reply.

7. A system for transferring an alerting phase session with a customized alerting tone, comprising a mobile switching center (MSC) and a customized alerting tones application server (CAT AS), wherein the MSC is configured to initiate a transfer of a normal media negotiation dialog between a calling user equipment (UE) and a called UE from a Packet Switch (PS) network to a Circuit Switch (CS) network and a transfer of a customized alerting tone session between the calling UE and the CAT AS from the PS network to the CS network when transfer from the PS network to the CS network occurs in an alerting phase session in which a customized alerting tone is played according to Early Session mode; and the CAT AS is configured to complete a negotiation update of the customized alerting tone session after receiving an update request of the customized alerting tone session, and to complete updates of both a Session Description Protocol (SDP) negotiation of the normal media between the calling UE and the called UE and a SDP negotiation of a customized alerting tone media of the customized alerting tone session between the calling UE and the CAT AS.

8. The system as claimed in claim 7, wherein the system further comprises a service centralization and continuity application server (SCC AS), a serving call session control function (S-CSCF), and an interrogating call session control function (I-CSCF); wherein the SCC AS is configured to send a transfer request reply to the MSC via the S-CSCF and notify the MSC that the customized alerting tone session needs to be transferred after receiving a call update reply returned by a called side network element; and the MSC is configured to initiate the transfer of the customized alerting tone session in the following way: after receiving the notification that the customized alerting tone session needs to be transferred, the MSC sending an update request including a SDP request of the customized alerting tone session, and the update request being sent to the CAT AS through the I-CSCF and the SCC AS successively.

9. The system as claimed in claim 8, wherein the SCC AS is configured to notify the MSC that the customized alerting tone session needs to be transferred in the following way: the SCC AS inserting an indication that the customized alerting tone session needs to be transferred into the transfer request reply.

10. The system as claimed in claim 7, wherein the system further comprises a service centralization and continuity application server (SCC AS), a serving call session control function (S-CSCF), and an interrogating call session control function (I-CSCF); wherein the CAT AS is further configured to forward a received call update reply returned by a called user to the SCC AS and notify the MSC that the customized alerting tone session needs to be transferred;

the SCC AS is configured to, after receiving the call update reply, send a transfer request reply to the MSC via the S-CSCF; and the MSC is configured to initiate the transfer of the customized alerting tone session in the following way: after receiving the notification that the customized alerting tone session needs to be transferred, the MSC sending an update request including a SDP request of the customized alerting tone session, and the update request being sent to the CAT AS through the I-CSCF and the SCC AS successively.

11. The system as claimed in claim 10, wherein
the CAT AS is configured to notify the MSC that the customized alerting tone session needs to be transferred in the following way: the CAT AS inserting the indication that the customized alerting tone session needs to be transferred into the call update reply; and
the SCC AS is further configured to include the indication that the customized alerting tone session needs to be transferred in the transfer request reply when sending the transfer request reply after receiving the call update reply.

12. A system for transferring an alerting phase session with a customized alerting tone, comprising a mobile switching center (MSC) and a customized alerting tones application server (CAT AS), wherein
the CAT AS is configured to initiate a transfer of a customized alerting tone session between a calling user equipment (UE) and the CAT AS from a Packet Switch (PS) network to a Circuit Switch (CS) network when transfer from the PS network to the CS network occurs in an alerting phase session in which a customized alerting tone is played according to Early Session mode; and
the MSC is configured to initiate a transfer of a normal media negotiation dialog between the calling UE and a called UE from the PS network to the CS network when the transfer from the PS network to the CS network occurs in the alerting phase session in which the customized alerting tone is played according to Early Session mode and complete a negotiation update of the customized alerting tone session after receiving an update request of the customized alerting tone session, and
to complete updates of both a Session Description Protocol (SDP) negotiation of the normal media between the calling UE and the called UE and a SDP negotiation of a customized alerting tone media of the customized alerting tone session between the calling UE and the CAT AS.

13. The system as claimed in claim 12, wherein
the system further comprises a service centralization and continuity application server (SCC AS) and a serving call session control function (S-CSCF);
the CAT AS is configured to initiate the transfer of the customized alerting tone session in the following way:
after receiving a call update reply returned by a called user, the CAT AS inserting a SDP request of the customized alerting tone session into the call update reply; and
the SCC AS is configured to send a transfer request reply, which includes the SDP request of the customized alerting tone session, to the MSC via the S-CSCF after receiving the call update reply.

\* \* \* \* \*